Oct. 31, 1939.   B. H. SCHWARZE   2,178,108
DIFFERENTIAL GALVANOMETER
Filed July 14, 1938

Inventor
Bruce H. Schwarze
By
Blackmore Spencer & Flint
Attorneys

Patented Oct. 31, 1939

2,178,108

UNITED STATES PATENT OFFICE 2,178,108

DIFFERENTIAL GALVANOMETER

Bruce H. Schwarze, Flint, Mich., assignor to General Motors Corporation, Detroit, Mich., a corporation of Delaware Application July 14, 1938, Serial No. 219,230

7 Claims. (Cl. 171—95)

This invention relates to differential galvanometers and particularly to a galvanometer for installation in a temperature indicating system of the electrical telemetric type. The gage in question is an improvement over the gages described and claimed in the Schwarze patent 2,139,386 and in copending application 180,718, Elbridge F. Bacon, filed December 20, 1937.

The principal improvement in the present gage relates to the elimination of the series resistor in the Schwarze application S. N. 164,652.

In conducting experiments and in taking tests with different types of gages and wires in an endeavor to make a better and less expensive gage it was found if the left hand coil, when considering the figures on the drawing, were made of a selected alloy which has a low temperature coefficient of resistivity, and by making the right hand coil of the gage of windings of wire which has a different temperature coefficient, such as copper wire, that a satisfactory gage was obtained and the series resistor of copending application S. N. 164,652 may be eliminated. The best wire for the left hand coil was found to be the Driver Harris Company Lohm wire. The precise chemical constituents of this wire are not known but it is known to have a specific resistance at 20° C. of 60 ohms per circular mil-foot and a temperature coefficient of resistance of .00071. By making the left hand coil of about 800 turns of Driver Harris No. 33 Lohm wire, it was found that the coil had a resistance of about 62 ohms. The right hand coil is made of about 650 turns of No. 33 copper wire which has a specific resistance at 20° C. of 10.37 ohms per circular mil-foot and a temperature coefficient of resistance of .00393.

The coils are mounted on angle brackets which are adjustably mounted on the frame of the gage. These angle brackets are preferably of magnetic material such as hydrogen annealed Armco iron.

Further to increase the effect of the field of the coils on the pointer pivoted at the intersection of their axes, the magnet—mounted on the shaft of the pointer—is increased in cross section and has straight sides instead of the usual angular sides of the conventional armature. This armature may have any given thickness and will retain a greater portion of magnetic flux and thus will be enabled easier to influence the movement of the pointer.

Figure 1:
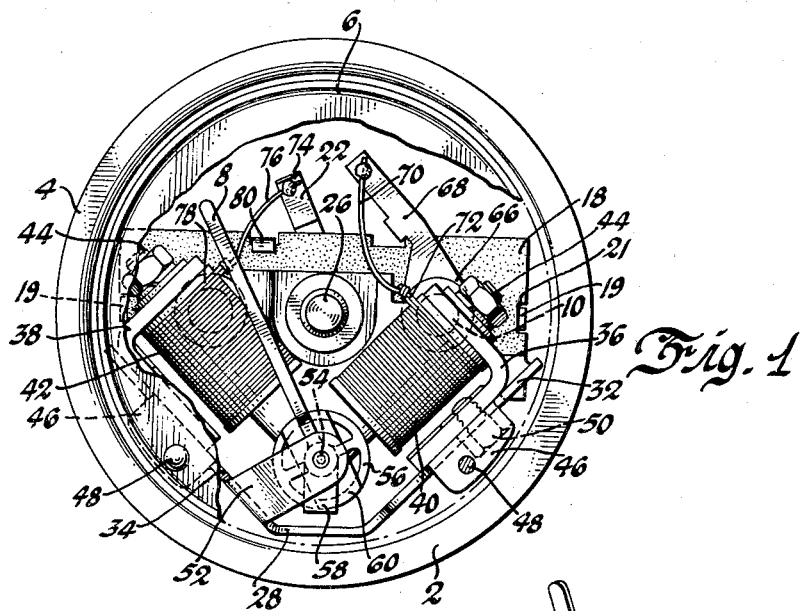
Figure 1 is a face view of the gage with the dial removed.

Referring to the drawing, the numeral 2 indicates the casing of the gage. This casing has the flange 4 over which there is adapted to be received the usual bezel and glass (not shown) to expose the dial 6 over which the pointer 8 swings to give a reading on the scale.

The bottom of the casing 2 has suitable openings through which pass the right and left studs 10 and 12. Adjacent the headed ends 64 and 16 of the studs 10 and 12 there is mounted the base 18 composed of insulating material. Ears 19 formed from the bottom of the case engage in notches 21 in the base 18 and line up the mechanism so that the studs 10 and 12 are central in clearance holes. Nuts 20 threaded on the studs 10 and 12 rigidly hold the casing 2, base 18, a fiber insulator 14 on the outside of the case, and studs 10 and 12 together. A contact plate 22 is confined between the base 18 and the bottom of the casing but is out of contact with the studs 10 and 12 and has a central enlarged opening in which there is received the head 24 of a rivet 26 which passes through the base member 18 and rigidly mounts thereon the frame 28. A contact strip 30 having one end connected to the head 16 of the stud 12 and the other end projecting between the frame 28 and the base 18 is rigidly held in place by the stud 12 and the rivet 26.

Figures 2, 3:
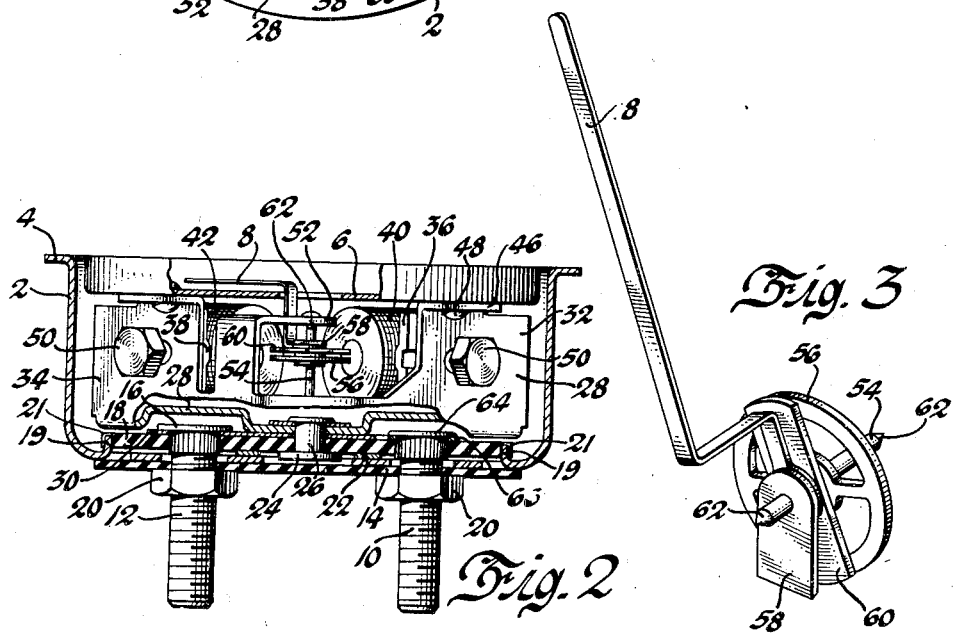
Figure 2 is a side view of the gage of Figure 1 with the casing and other parts shown in section and parts broken away better to illustrate the construction.
Figure 3 is a perspective view of the pointer and related mechanism.

The frame 28 has the upwardly bent sides 32 and 34 on which there are adjustably mounted the angle irons 36 and 38. On the angle iron 36 there is mounted the right hand coil 40 and on the angle iron 38 there is mounted the left hand coil 42. One arm of the angle irons 36 and 38 is secured to the upturned sides 32 and 34 while the other arm projects at right angles to the side and has secured thereto by means of the threaded stud 44 the ends of the coils 40 or 42 as the case may be. The upturned sides 32 and 34 have the ears 46 on which the dial 6 is mounted by means of the rivets or machine screws 48. Suitable machine bolts 50 adjustably mount the angle irons 36 and 38 to the sides 32 and 34. This adjustability is accomplished by making an oval opening in the sides 32 and 34. The frame 28 is provided with an ear 52 which extends into the gage and serves as one mounting for a shaft 54 on which the pointer 8 is rigidly mounted. A vibration dampener 56 is free to move independently of the shaft and a weight 58 is secured thereon to counterbalance the weight of the pointer 8. The permanent magnet armature 60 is rigidly secured to the shaft 54 and by referring to the detail in Figure 3 it will be seen that the sides of the armature are straight instead of being somewhat angular or tapering from the outside toward the center. In the usual armatures the metal is wider at the outside than at the middle where it is secured to the shaft. This increase in the cross sectional area of the armature gives increased strength of pointer action for the reason that the armature, because of its increased cross sectional area, will be able to retain a greater portion of the magnetic flux on being magnetized and thus be a stronger magnet. The shaft 54 has the tapered ends 62 which are mounted in the base of the frame 28 and the ear 52.

Between the head 64 of the stud 10 and the base 18 there is secured the perforated end 66 of a contact finger 68 the end of which has connected thereto the wire 70 which leads to the end turn 72 of the coil 40.

The contact plate 22 has a finger 74 integral therewith and a wire 76 is connected to the finger 74 and to the end turn 78 of the coil 42. The contact plate 22 is secured to the base 18 by means of turned over ears one of which is indicated at 80 in Figure 1.

The coil 42, or the left hand coil, is preferably made of about 800 turns of wire known as Driver Harris Company No. 33 Lohm wire and coil 40, or the right hand coil, is preferably made of about 650 turns of No. 33 copper wire. It has been found that with the coils made of these specific wires having the temperature coefficient of resistivity as given in the statement of invention, no additional resistance in series with the left hand coil is needed to give the proper reading on the dial 6, and to minimize internal and external heating error.

In some cases both coils should be wound with alloys having low temperature coefficients of resistivity while in other cases better temperature compensation will be had by winding the coils with wire having different temperature coefficients, such as above mentioned, by having the left hand coil wound with a plurality of turns of Lohm wire and the right hand coil with copper wire. The specific wire to be used with the coils will depend upon the use to which the gage is to be put and depend upon the character of the unit of the telemetric system which is positioned at the place or in the medium the temperature of which is to be determined. By using coils wound with Lohm wire which has a temperature coefficient of resistivity higher than that of copper, suitable coils for 12 volt gage operation can be made without the heating and temperature error encountered with copper wound coils.

If desired, the left hand coil strength may be increased by using an angle iron bracket 38 of magnetic material such as soft iron, while the bracket 36 may be of some non-magnetic material such as brass. In other instances both angle irons 36 and 38 should be of magnetic material such as soft iron. It may be of advantage in some cases to have both brackets of non-magnetic material.

Figure 4:
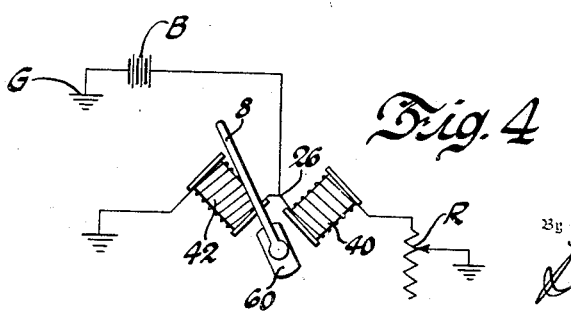
Figure 4 is a diagrammatic view of the circuit of which the gage is a part.

Figure 4 shows the circuit in which the galvanometer is incorporated. The battery is shown at B, one side of which is grounded at G. The letter R indicates a variable resistance in series with coil 40. The strength of energization of the coil 40 will depend on the amount of resistance R in series with the coil. The greater the resistance R, the less current through the coil and the weaker its field, the less resistance the more current and the stronger the field. As the field of coil 40 grows stronger, and since the field of coil 42, which is connected directly across the battery, is substantially constant, the armature will move toward the coil 40. The resultant field of the two coils will determine the position of the armature 60 and the pointer 8.

The path of the current through the gage is as follows: the current will enter the stud 12, pass through the jumper strip 30 to the frame 28 and from the frame 28 to the inside turns of the coils 40 and 42. From the coil 40 the current will pass through the wire 70, the finger 68, stud 10, resistance R and back to the battery. From the coil 42 the current will pass through the wire 76, the finger 74, contact plate 22, the casing 2 of the gage and back to the battery through the various metallic substances on which the gage casing is mounted. In the case of an automotive vehicle, in connection with which the present gage is to be used, the current will pass through the instrument board and the various metal connections back to the battery.

The present gage is intended for use in connection with a heat indicator or engine unit mounted in the engine to determine the temperature of the water circulating system of an internal combustion engine used on an automotive vehicle. The engine unit will have therein a variable resistance R and the conductivity or resistivity of the resistance will depend upon the temperature of the water. The higher the temperature of water the greater the conductivity of the unit so that a greater amount of current will be allowed to pass through the gage of the invention all the stronger to energize coil 40 and to create a differential field to affect the armature 60 and cause the pointer 8 to swing across the dial. By graduating the dial to read directly in temperatures instead of units of current, the temperature of the water of the engine cooling system may be read directly.

I claim:

1. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, the windings of one of said coils comprising a wire having a different temperature coefficient of resistivity than the wire of the other coil.

2. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, one of said coils comprising substantially 800 turns of wire having a resistance of substantially 62 ohms, the other coil comprising substantially 650 turns of No. 33 copper wire.

3. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, one of said coils comprising a wire having a specific resistance at 20° C. of 60 ohms per circular mil-foot and a temperature coefficient of resistivity of substantially .00071, the other coil being wound of 600 turns of No. 33 copper wire.

4. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, one of said coils comprising a wire having a specific resistance at 20° C. of 60 ohms per circular mil-foot and a temperature coefficient of resistivity of substantially .00071, the other of said coils being wound of a plurality of turns of wire having a specific resistance of substantially 10.37 ohms at 20° C. and a temperature coefficient of resistance of .00393.

5. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, one of said coils being wound of a wire having a temperature coefficient of resistivity of substantially .00071, the other coil being wound of a wire having a temperature coefficient of resistivity of substantially .00393.

6. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, one of said coils being wound of wire having a temperature coefficient of resistivity of .00393.

7. In a differential galvanometer, a metal frame, two coils mounted on the frame and electrically connected thereto, said coils being arranged in fan shape, a pivotally mounted pointer having an armature secured thereto, said armature being in the field of the coils and capable of moving the pointer according to the differential energization of the coils, one of said coils being wound of a wire having a resistance of 60 ohms per circular mil-foot at 20° C. the other of said coils being wound of a wire having a resistance of 10.37 ohms per circular mil-foot at 20° C.

BRUCE H. SCHWARZE.